US005117346A

United States Patent [19]

Gard

[11] Patent Number: 5,117,346

[45] Date of Patent: May 26, 1992

[54] CONVERTOR PLANT ROLLER CONTACT CONNECTOR FOR CONVERTOR PLANT

[75] Inventor: Inge Gard, Ludvika, Sweden

[73] Assignee: ASEA Brown Boveri AB, Vasteras, Sweden

[21] Appl. No.: 686,999

[22] Filed: Apr. 18, 1991

[30] Foreign Application Priority Data

Apr. 23, 1990 [SE] Sweden ................................ 9001436

[51] Int. Cl.[5] ............................................. H02M 7/00

[52] U.S. Cl. ..................................... 363/51; 361/332; 307/151; 174/69

[58] Field of Search .......................... 174/69; 307/151; 361/332; 363/35, 51, 68, 125, 126, 129, 144

[56] References Cited

U.S. PATENT DOCUMENTS

| | | | |
|---|---|---|---|
| 4,090,233 | 5/1978 | Thiele et al. | 363/68 |
| 4,142,230 | 2/1979 | Menju et al. | 307/151 |
| 4,318,169 | 3/1982 | Olsson | 363/123 |
| 4,494,173 | 1/1985 | Ikekame et al. | 361/332 |
| 4,583,158 | 4/1986 | Ikekame et al. | 363/68 |
| 4,631,656 | 12/1986 | Olsson | 363/144 |
| 4,688,142 | 8/1987 | Hjortsberg et al. | 363/51 |
| 4,816,980 | 3/1989 | Wiendl | 363/35 |

FOREIGN PATENT DOCUMENTS

| | | |
|---|---|---|
| 584297 | 9/1933 | Fed. Rep. of Germany . |
| 1059542 | 5/1967 | Fed. Rep. of Germany . |

*Primary Examiner*—J. Sterrett

*Attorney, Agent, or Firm*—Watson, Cole, Grindle & Watson

[57] ABSTRACT

When dimensioning electrical plants for high voltages for regions exposed to earthquakes, it is necessary to design the current paths between the different apparatuses in such a way that the apparatuses in case of great oscillations are not subjected to abnormally great forces at the points of connection. The problem arises particularly in connection with convertor plants for high-voltage direct current designed with suspended valves, since the oscillating amplitudes there may become considerable. The invention relates to a current path intended for such plants, which is flexible its longitudinal direction and comprises at least two parallel, non-insulated straight conductors which are each connected to a respective end of the current path and electrically interconnectd via roller contact elements, the contact force of which is individually resilient.

6 Claims, 3 Drawing Sheets

CONVERTOR PLANT ROLLER CONTACT CONNECTOR FOR CONVERTOR PLANT

TECHNICAL FIELD

The present invention relates to a convertor plant, preferably for high voltage, comprising at least one valve assembly composed of one or more electrically series-connected valves, the valve assembly being suspended from a supporting structure with the aid of a suspension device arranged at the upper end of the assembly, as well as a transformer which is connected to the valve assembly via a flexible connector.

BACKGROUND ART

When dimensioning electrical plants for high voltages for seismic regions, it is necessary to design the current paths between the different apparatuses in such a way that the apparatuses, in case of large oscillations, are not exposed to abnormally great forces at the points of connection.

The problem arises particularly in connection with valve halls in plants for high voltage direct current, in which the valves are suspended from the roof to protect them against seismic stresses (see U.S Pat. No. 4,318,169). In such plants, the oscillation amplitudes may become relatively great, up to about $\pm 1$ m, and special arrangements must therefore be made to make the oscillations of the current paths controllable so as to be able to maintain the operation also during and after an earthquake.

Making the flexible connectors between the transformer and the valve assemblies, in a plant as described in the above U.S. patent, in the form of slack conductors would require unreasonably large phase distances. For that reason, a design for the above-mentioned purpose has been proposed which comprises two coaxial tubes which are telescopically displaceable relative to each other and which, at their outer ends, are attached to the valve assembly or the transformer bushing in question by means of cardan or ball joints, which are electrically bridged by means of copper strands. The electrical connection between the two tubes takes place via a flexible copper band which is arranged inside the tubes and mounted in the form of a loop over two spaced-apart rollers. A drawback with this design is that the tubes have to be perforated to attain sufficient cooling of the enclosed connection. This in turn leads to a deterioration of the current-carrying capacity and the mechanical stiffness of the tubes.

SUMMARY OF THE INVENTION

In addition, the design is relatively heavy and expensive, in particular if it is to be designed to withstand relatively great displacements.

The present invention aims to provide, for convertor plants of the above-mentioned kind, a flexible connector which does not suffer from the above-mentioned drawbacks. This is achieved according to the invention by a rolling contact connector as will be described more fully hereinafter.

The central part of the connector consists of a current path which is flexible in its longitudinal direction and comprises at least two parallel, non-insulated, straight conductors which are each connected to a respective end of the current path and electrically connected to each other via contact rollers, the contact force of which is individually resilient. The conductors and contact rollers in this design may be exposed to the environment, whereby good cooling is obtained. The design may be easily adapted to plants with different rated currents by changing the diameter and the number of the conductors and by changing the number of roller contact elements.

Suitably, the connector is provided with four or a greater even number of conductors, which are adapted such that they form the contour of a tube. In this way, the connector may be adapted to the line voltage in question, thus obtaining a field configuration favourable for avoiding corona discharges.

From the technical field of electric switching devices it is known, per se, to use contact rollers for connection between two contact parts which are movable relative to each other (see, e.g., German Patents Nos. 584297 and 1059542). However, the known designs of this kind are intended to operate under entirely different conditions than those which prevail in connection with convertor plants of the above kind which are exposed to the risk of earthquakes.

BRIEF DESCRIPTION OF THE DRAWINGS

The invention will be explained in greater detail, by describing an embodiment, with reference to the accompanying drawings, wherein.

DESCRIPTION OF THE PREFERRED EMBODIMENT

Figure 1:
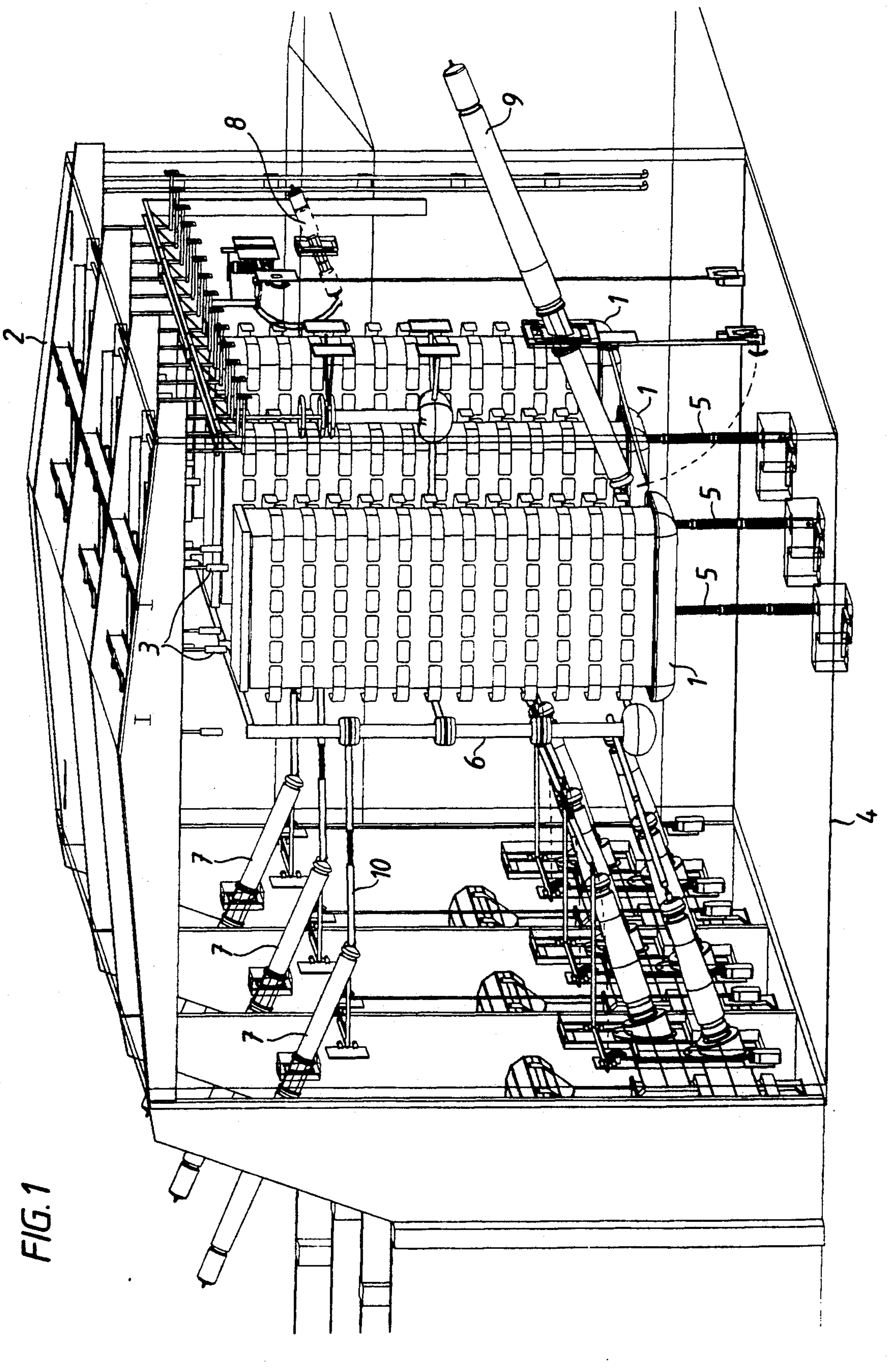
FIG. 1 shows a perspective view of a convertor plant in which the present invention is included.

FIG. 1 shows a convertor station with a 12-pulse convertor composed of three valve assemblies 1, each one consisting of four electrically series-connected valves. Each valve assembly forms a vertical column with the valves in the assembly placed one above the other. The valve assemblies are housed in a building 2 (valve hall), in which the assemblies are suspended from the roof of the building by means of suspension insulators 3. For damping pendulum movements relative to the base 4, each valve assembly is provided with damping means of, for example, hydraulic type which, by way of an insulator chain, connect the respective valve assembly to the base. The insulator chain 5 is pivotably attached at its ends by means of universal joints or the like. A surge arrester 6 is arranged in parallel with each valve assembly 1.

The convertor station has two convertor transformers (not shown), one of which is Y/D-connected and the other Y/Y-connected. The transformers are placed close to the wall of the building with the phase outputs of the valve side of the transformers passed via bushings 7 through the wall of the building. The inner ends of the bushings are connected via flexible connectors 10 to the a.c. connections of the respective valve assembly.

The upper ends of the valve assemblies are electrically connected to each other and connected to a bushing 8 arranged in the wall of the building and constituting one of the d.c. terminals of the convertor. In similar manner, the lower ends of the valve assembles are interconnected and connected to a bushing 9 which constitutes the other d.c. terminal of the convertor.

Figure 2:
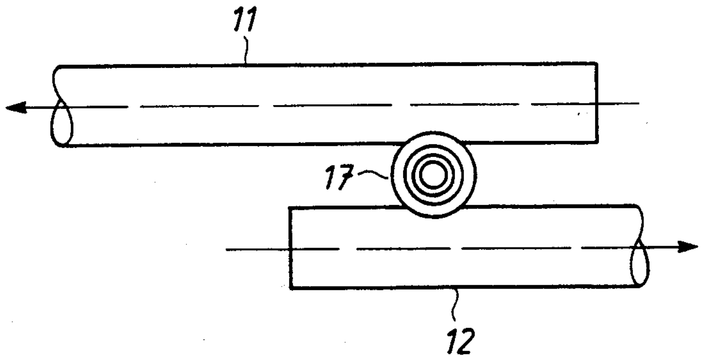
FIGS. 2 and 3 illustrate the principle of a flexible connector included in the convertor plant, central parts in the connector being shown in a side view (FIG. 2) and an axial view (FIG. 3), respectively.
Figure 3:
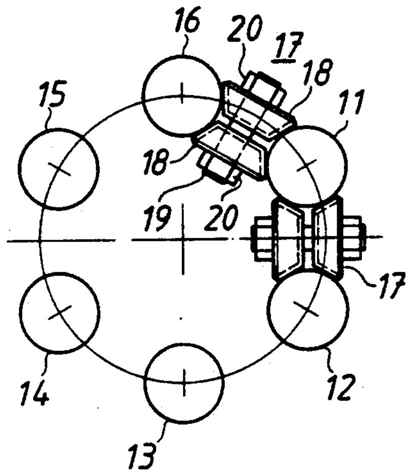

The principle of the flexible connectors 10 is clear from FIGS. 2 and 3.

The central part of the connectors 10 consists of a current path which is flexible in its longitudinal direction and comprises two groups of parallel, non-insulated straight conductors 11–16 with an equal number of conductors in each group. The two conductor groups 11, 13, 15 and 12, 14, 16, respectively, are each connected to a respective end of the current path. In the shown example (FIG. 3), the connection is made with six conductors which are arranged in a ring formation, every other conductor in the ring formation belonging to the same conductor group. The conductors of the two groups are electrically connected to each other via a number of cup-shaped contact rollers 18 with conical contact surfaces. The contact rollers are brought together in pairs to form a number of roller contact elements 17. The two rollers 18 in such a contact element are positioned on a common shaft 19 and are pressed against two conductors 11 and 12, respectively, positioned adjacent to each other and belonging to different conductor groups, with the aid of two compression springs 20 located on separate sides of the contact rollers.

Figure 4:
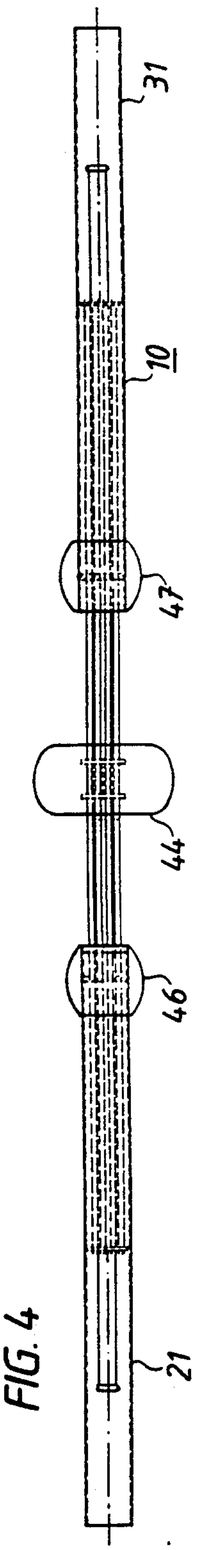
FIG. 4 shows a side view of a flexible connector according to the invention.
Figure 5:
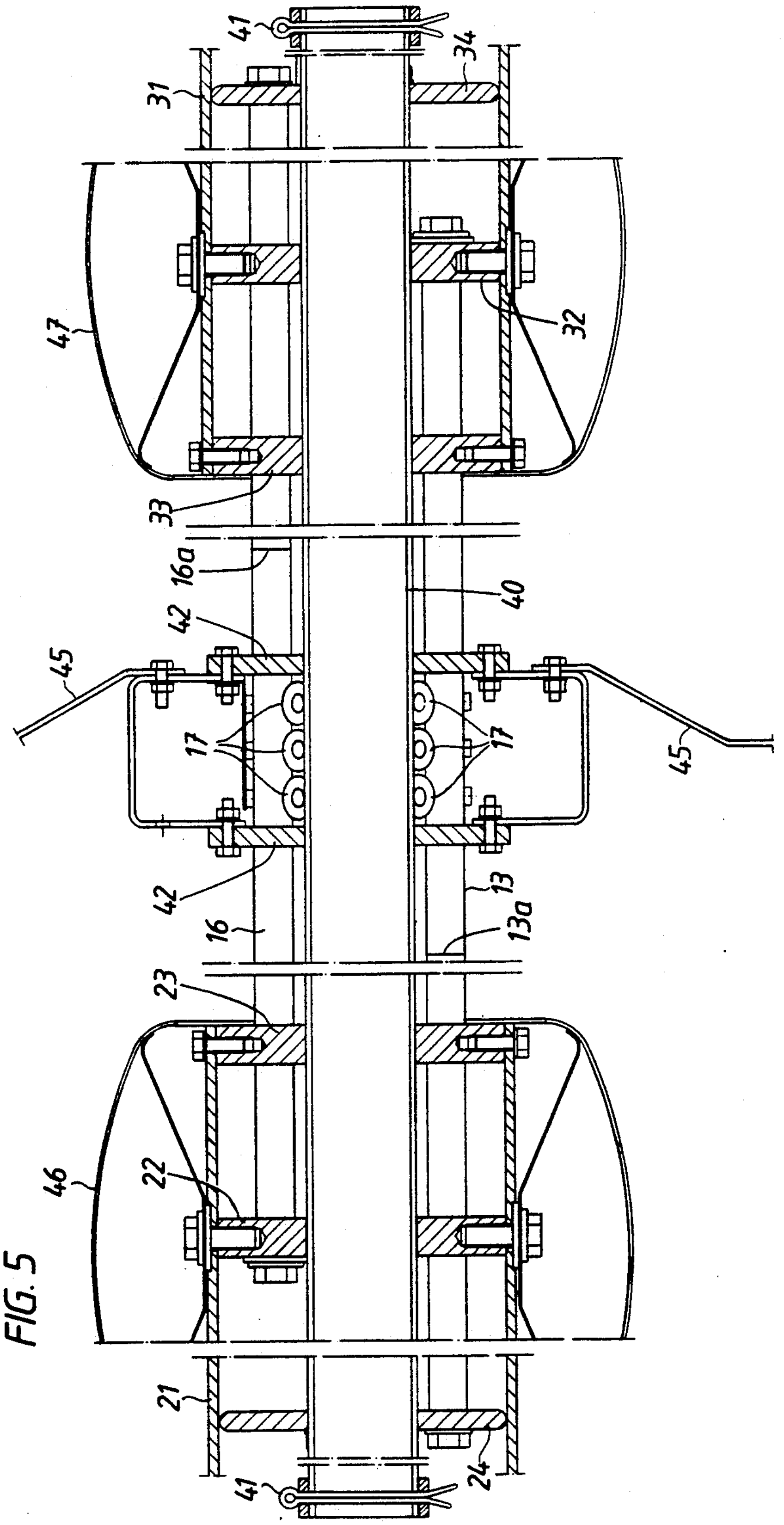
FIG. 5 shows in longitudinal section the central parts of the above-mentioned connector.

The flexible connector shown in FIGS. 4 and 5 consists of two coaxial, axially spaced-apart aluminium tubes 21, 31, which are interconnected by means of two groups 11, 13, 15 and 12, 14, 16, respectively, of parallel, non-insulated straight conductors, each group being connected to one of the tubes, as well as roller contact elements 17, arranged between the conductors, of the embodiment described above. The connector is mechanically fixed to the convertor plant according to FIG. 1 by means of universal joints, for example cardan or ball joints, arranged at the outer ends of the tubes 21, 31, these joints being electrically bridged by flexible electrical conductors such as copper strands or the like.

FIG. 5 shows how a conductor 16 in one of the conductor groups is electrically connected to one of the aluminium tubes 21 via a circular metal disc 22 which is fixed to the tube and the periphery of which makes contact with the inner surface of the tube. A conductor 13 in the other conductor group is, in similar manner, connected to the other aluminium tube 31 via a metal disc 32. The conductor 16 and the other conductors (not shown) belonging to the same conductor group are passed with slip fit through holes in an insulating material disc 33 attached to the end of the tube 31, further through clearance holes (with insulation distance) in the metal disc 32, and are attached to an insulating guide disc 34 arranged at the ends of the conductors, the guide disc being able to slide inside the tube 31. The conductors 13 and the other conductors in the same conductor groups are in the same way passed through an insulating material disc 23 and the metal disc 22 in the tube 21, and are attached to an insulating guide disc 24 slidably arranged in the tube 21.

For mechanical reinforcement of the connector according to FIGS. 4 and 5, the device is provided with a centrally arranged stiffening tube 40, made, for example, of stainless steel, which passes, with slip fit, through central holes in the insulating discs 23, 24, 33, 34 in the aluminium tubes 21 and 31. Through the metal discs 22 and 32, the stiffening tube 40 passes through central clearance holes without metallic contact between the tube and the discs. The stiffening tube 40 is provided at its ends with locking pins 41.

The roller contact elements 17 for electrical connection between the two conductor groups are arranged between two insulating material discs 42, which are provided on the stiffening tube 40 and have holes for the conductors of the two conductor groups, such as 13 and 16, so that these are kept in a fixed spaced relationship to each other. In the embodiment shown, three roller contact elements 17 are provided in each interspace between two adjacently located conductors. Dimensioning for the number of roller contact elements 17 is the current load of the conductors 11–16 which current load is also dimensioning for the diameters of the conductors and the number of parallel-connected conductors. The length of the conductors is determined by the oscillating amplitude of the connected apparatuses.

The current-carrying part of the connecting conductors 13 and 16 (FIG. 5), namely, that part which extends from the connection of the respective conductor to the aluminium tube 31 and 21, respectively, up to a dividing line 13*a* and 16*a*, respectively, on the opposite side of the roller contact elements 17, may suitably be made of silver-plated copper, whereas the other part of the conductors, which at moderate oscillations only has a guiding function, may be made of aluminium.

The roller contact elements 17 are surrounded by a field-controlling toroid 44, which is supported by supporting arms 45 fixed to the insulating discs 42. Also the end portions of the aluminium tubes 21, 31 are surrounded by field-controlling solids of revolution 46 and 47, respectively.

In a practical embodiment the aluminium tubes 21, 31 may have an external diameter of, for example, 160 mm. The distance between the confronting ends of the tubes may be, for example, 1 m and the total length of the connector 10, for example, 5 m.

The invention is not limited to the embodiment shown, but several modifications are possible within the scope of the claims. For example, the roller contact elements 17 need not be provided with compression springs 20 on both sides of the contact rollers 18, but they may instead be provided with one single spring with a greater length, arranged on one side of the rollers.

I claim:

1. A converter plant comprising at least one valve assembly comprising one or several electrically series-connected valves, said valve assembly being suspended from a supporting structure by a suspension device arranged at an upper end of the assembly, and a transformer connected to the valve assembly by a flexible connector, wherein said connector comprises at least two parallel, non-insulated straight conductors, one of said conductors being fixed to the valve assembly and the other of said conductors being fixed to the transformer, said conductors being electrically interconnected via at least one roller contact element comprising two contact rollers arranged on a common shaft, said contact rollers being pressed by means of at least one spring against the conductors, said connector further comprising two coaxial, electrically conducting tubes arranged in axially spaced relationship to each other, the confronting ends of said tubes each being fixed to a respective one of said conductors.

2. A plant according to claim 1, wherein the connector comprises four or a greater even number of parallel conductors, which are arranged so as to form the contour of a tube.

3. A plant according to claim 1, wherein a stiffening tube, arranged coaxially with the two conducting tubes for mechanically stiffening the connector, extends between the two conducting tubes and projects into the conducting tubes and is supported against each one of the conducting tubes by means of two spacers, respectively, arranged in spaced relationship to each other in each conducting tube, said spacers surrounding the stiffening tube with slip fit.

4. A plant according to claim 1, wherein the ends opposite said confronting ends of the tubes are provided with universal joints for mechanically attaching the connector.

5. A plant according to claim 1, wherein the conductors project into the confronting ends of the tubes and are each electrically connected to a respective one of the tubes via a circular metal disc, respectively, fixed in the respective tube, the periphery of said disc making contact with the inner surface of the connecting tube.

6. A plant according to claim 1, wherein electrically insulating discs with guide holes for said conductors are arranged at the confronting ends of the tube.

* * * * *